United States Patent [19]

Spencer et al.

[11] Patent Number: 5,693,354
[45] Date of Patent: Dec. 2, 1997

[54] METHOD OF DISINFECTING FRESH VEGETABLES BY PROCESSING THE SAME WITH A LIQUID CONTAINING A MIXTURE OF ARGON:CARBON DIOXIDE

[75] Inventors: Kevin C. Spencer, Hinsdale; Edward F. Steiner, Lombard, both of Ill.

[73] Assignees: L'Air Liquide, Societe Anonyme pour L'Etude et, L'Exploitation des Procedes Georges Claude, Paris Cedex, France; American Air Liquide Inc., Houston, Tex.

[21] Appl. No.: 640,473

[22] Filed: May 1, 1996

[51] Int. Cl.$^6$ .................................................. A23B 7/157
[52] U.S. Cl. .......................................... 426/335; 426/270
[58] Field of Search ................................. 426/312, 316, 426/319, 320, 326, 333, 435, 419, 270

[56] References Cited

U.S. PATENT DOCUMENTS

| | | | |
|---|---|---|---|
| 3,851,080 | 11/1974 | Lugg et al. | 426/312 |
| 4,411,921 | 10/1983 | Woodruff | 426/320 |
| 4,946,326 | 8/1990 | Schvester et al. | 426/320 |
| 5,143,096 | 9/1992 | Steinberg | 426/445 |
| 5,393,547 | 2/1995 | Balaban et al. | 426/335 |

*Primary Examiner*—Stanley S. Silverman
*Assistant Examiner*—Theodore M. Green
*Attorney, Agent, or Firm*—Oblon, Spivak, McClelland, Maier & Neustadt, P.C.

[57] ABSTRACT

A method of washing one or more fresh vegetables, which entails washing the one or more fresh vegetables with at least one aqueous liquid containing at least an antimicrobially effective amount of dissolve carbon dioxide, and at least an amount of dissolved argon effective to inhibit bleaching and oxidizing effects of carbon dioxide.

13 Claims, 5 Drawing Sheets

METHOD OF DISINFECTING FRESH VEGETABLES BY PROCESSING THE SAME WITH A LIQUID CONTAINING A MIXTURE OF ARGON:CARBON DIOXIDE

BACKGROUND OF THE INVENTION

1. Field of the Invention

The present invention relates to a method of disinfecting fresh vegetables by processing the same with a liquid containing a mixture of argon:carbon dioxide, and also a method of maintaining carbon dioxide concentrations in aqueous solutions at a given level by adding argon to the system.

2. Description of the Background

It is known that nitrogen may be used to displace oxygen in order to prevent oxidation or to limit respiration. Carbon dioxide may be used for the same purpose and is also used in beverages to provide effervescence.

It is further known that carbon dioxide may be used as a microbicidal or microbiostatic agent or as a solute in disinfecting solutions.

Vegetable products have been subjected to chlorinating treatments for disinfection. Unfortunately, treatment with chlorine imparts an off-taste and causes considerable chemical damage to the final product. This damage is manifested by bleached color, poor taste, poor aroma retention, oxidation of product, poor texture, poor flavor and fragrance profiles and an overall quality which is perceived as poor by the customer.

Although it is known that carbon dioxide can be dissolved in aqueous solution to produce a carbonated disinfecting solution, such a solution is not as effective as a chlorinated washing solution. Further, oxidative deterioration of vegetables is observed with products washed with carbonated solutions as well as with chlorinated solutions.

Generally, several methodologies are presently known for disinfecting foods.

For example, U.S. Pat. No. 4,454,723 describes a refrigerated trailer cooled by sprinkler water with concomitant release of nitrogen from a cryogenic source, for inerting the respiration of produce.

U.S. Pat. No. 4,522,835 shows that gases containing molecular oxygen in their molecules are often reactive with food systems. Examples of such gases are $O_2$, $CO_2$, and CO. Preservation of color in meat, poultry, fish may be obtained by reducing $O_2$ content to produce myoglobin/hemoglobin versus the ordinary oxidized states of oxymyoglobin/hemoglobin, and then adding CO to produce carboxymyoglobin/carboxyhemoglobin. Thereinafter, the produce is stored under $CO_2$ to maintain the improved color. Storage under inert $N_2$ is possible, as is further reoxidation using $O_2$.

EP 354337 describes the use of $CO_2$ as an antibacterial agent in the preservation of foods, and the effectiveness of this method has been widely demonstrated.

U.S. Pat. No. 3,535,124 describes a process for preservation of fresh fruit juice in a dispenser using $CO_2$, wherein the juice is preferably sprayed through an inert atmosphere.

U.S. Pat. No. 3,587,203 describes the gas packaging of tossed salad, which is cut and prepared ready to eat, where it is stored in an inert atmosphere in order to prevent oxidative discoloration.

Zee et al., 1984, describe the effects of CO, $CO_2$, and $N_2$ on bacterial growth on meat under gas packaging. Argon was used as an inert control. It was found that Ar and $N_2$ were equivalent in inhibiting growth of anaerobes, acting as inerting agents therefor. Specifically, four strict aerobes, three anaerobes, and twelve facultative anaerobes isolated from meat were grown under $CO_2$, Ar, $N_2$, CO, where Ar was found to be "inert" even when containing 10–70% $N_2$, $CO_2$, or CO. However, the effect of Ar was found to be strictly to the gases with which it was admixed.

A two-step treatment process for the treatment of fresh fruits and vegetables is described in FR 2652719, wherein nitrous oxide (10–100%) in admixture with $O_2$ and/or $CO_2$ is applied to vegetables in a first phase of treatment, followed by a separate second phase treatment with a gas mixture which contains nitrous oxide ($N_2O$) (10–99%) admixed with $O_2$ or $CO_2$ or $N_2$, whereby preservation is effected by action of $N_2O$. Therein, it is clearly described that nitrogen or argon are equivalent inert gases which may be freely used to complement in bulk any given gas mixture without effect.

$N_2O$ is shown to prevent ethylene formation and provides significant fungistatic activity. Nitrous oxide is widely used in food packaging and preservation are known, e.g., FR 2191850.

FR Pat. Appl. 31/7/1990 and EP 0422995 also describe a two-step treatment for preserving fresh vegetables by exposure at refrigerating temperatures under an atmosphere of nitrous oxide and/or argon (other noble gases are specifically claimed to be inert) and optimally oxygen. Mixtures used variously include high titers of $N_2O$, $O_2$, $CO_2$ or $N_2$.

In essence, the disclosed two-step process, which is not simple gas packaging, entails applying $N_2O$ or argon which directly interfere with the production of ethylene by tomatoes. Argon is described as having a specific utility in this regard, however, it is clear from the data presented therein that argon only functions to displace oxygen from the tissues of the fruit and thereby to limit respiration, and thereby ethylene production. It is also clear that that the data presented show a difference in ethylene production of air, $N_2$, Ar, and $N_2O$ which is precisely identical to their differences in solubility in the fruit. The present inventors have established as much by duplicating the above experiment wherein adequate controls for solubility were made by including other gases. Thereby, it has been ascertained that depression of ethylene may be completely explained by the displacement of oxygen.

The above experiments with food demonstrate only that argon is inert, and, moreover, confirm that preservation with argon is superior to simple air displacement with "inert" gases. Further, effects are only noted when the product is packaged in the gas of interest, or when significant retention of gas is manifested in the package. No transient treatment combining argon and carbon dioxide is either described or suggested.

Addition of argon to a mixture of $CO_2+O_2$ is described in U.S. Pat. No. 4,946,326, as being effective in preserving seafood and fish at 4° C., packaged under the mixture. The mixture contains, in partial pressure, 5–68% $CO_2$, 5–20% $O_2$, and 27–45% Ar, preferably 50:20:30/$CO_2$:$O_2$:Ar. This patent describes the mixture as slowing down enzymatic and chemical reactions at the surface of and inside of fish and seafood products, as well as growth of some microorganisms, such as fungus.

The results described therein, however cannot be considered reproducible, and are due entirely to careful control of processing hygiene, and the effects of $CO_2$ on microbes. The data presented are not statistically significant, and, moreover, do not control for the obvious effects of $CO_2$, $O_2$, and $N_2$ alone or in mixtures without noble gases. Clearly, it cannot be concluded, therefore, that any observed effect is, in fact, due to argon or to any specific mixture disclosed therein.

EP 354337 describes the effect of $CO_2$ upon bacterial systems. Such effects are widely known and are understood as being caused by the depressive effect of $CO_2$ upon ordinary respiratory processes, which cannot be interpreted as being specifically anti-enzymatic. The results described in U.S. 4,946,326 can be largely attributed to the simple depression of respiration by $CO_2$.

Thus, a need exists for a means by which fresh vegetables may be washed without attendant bleaching and general oxidative degradation as is caused by carbon dioxide.

At the same time, very little is known regarding methods by which control of carbon dioxide concentrations in aqueous solution may be effected. Although nitrogen has been used to strip carbon dioxide from liquids, the present inventors are aware of no prior art which describes a more effective means for controlling carbon dioxide concentrations in solution.

Thus, a need also exists for a more effective means of controlling carbon dioxide concentrations in an aqueous solutions containing the same.

SUMMARY OF THE INVENTION

Accordingly, it is an object of the present invention to provide a method of ameliorating the bleaching and oxidizing effects of carbon dioxide in the washing of food.

It is also an object of this invention to provide a method of washing fresh vegetables in an aqueous liquid, whereby vegetables having superior flavor, fragrance, aroma, taste, color and texture are afforded.

The above objects and others are provided by a method of washing one or more fresh vegetables, which entails washing the one or more fresh vegetables with an aqueous liquid having dissolved therein an antimicrobially effective amount of carbon dioxide and an amount of dissolved argon effective to inhibit the bleaching and oxidizing effects of carbon dioxide. The amount of argon and carbon dioxide used is effective to enhance at least one of the flavor, fragrance, aroma, taste, color and texture of the vegetables.

It is also an object of the present invention to provide a method of controlling carbon dioxide concentrations in aqueous solutions which is more effective than conventional methods using nitrogen.

This object and others are provided by a method of controlling carbon dioxide concentration in an aqueous solution containing the same, which entails dissolving argon in the aqueous solution to an amount effective to maintain a desired level of carbon dioxide in the solution.

DETAILED DESCRIPTION OF THE PREFERRED EMBODIMENTS

Figure 1:
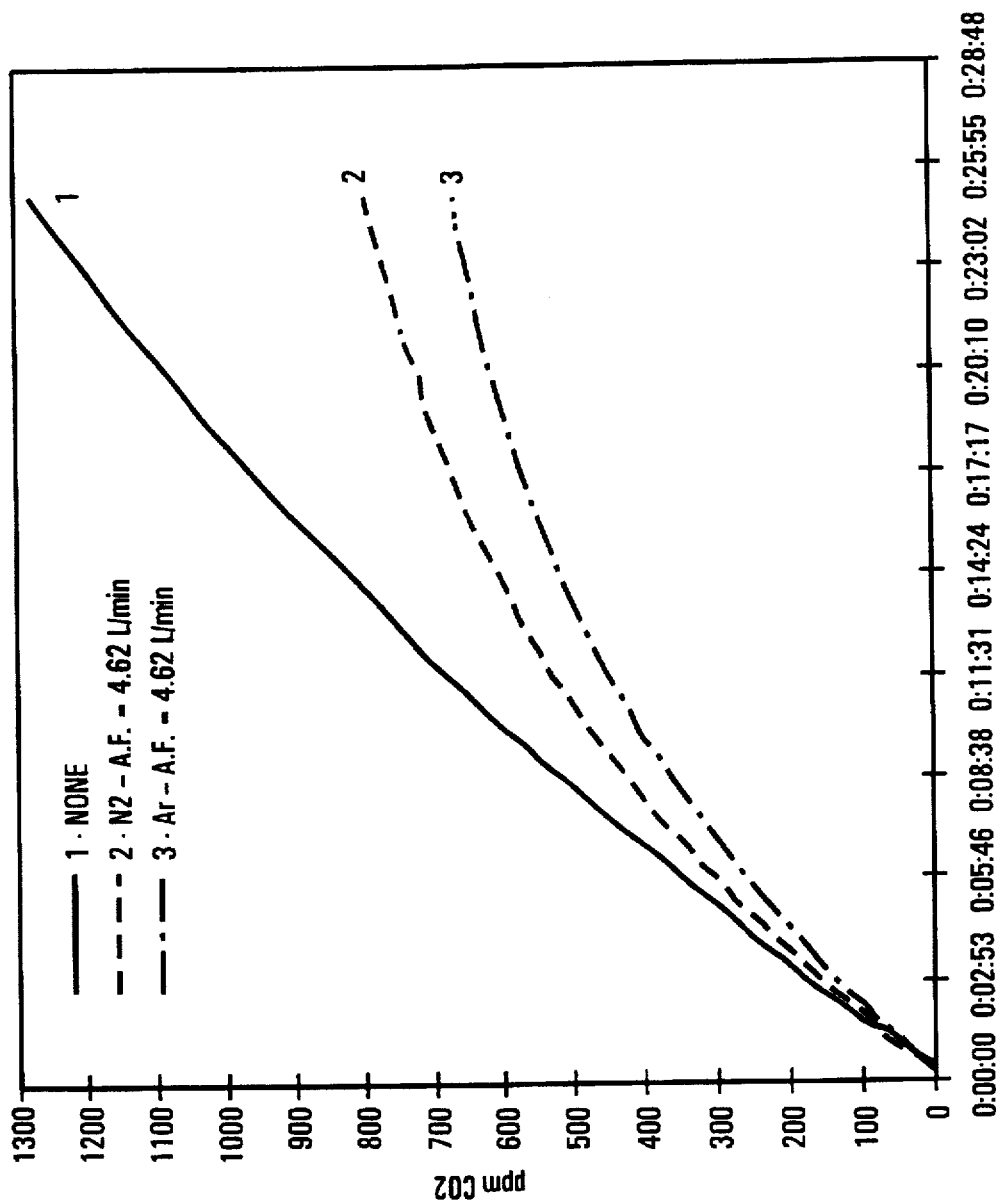
FIG. 1 illustrates $CO_2$ saturation curves obtained with a sparging experiment.

In accordance with one aspect of the present invention, it has been surprisingly discovered that when fresh vegetables are washed with an aqueous liquid containing carbon dioxide dissolved therein, that the bleaching and oxidizing effects of carbon dioxide can be ameliorated or avoided altogether by also washing the fresh vegetables with an aqueous liquid having dissolved therein argon. Generally, the present invention provides a method whereby fresh vegetables are washed during processing in an aqueous liquid, such as fresh water or water containing solutes, such as salts, buffers alcohols or even chlorine, wherein the aqueous liquid contains particular quantities of dissolved carbon dioxide and argon. As noted above, it has been surprisingly discovered that the argon ameliorates, or avoids altogether, the bleaching and oxidizing effects of carbon dioxide so as to produce final washed vegetable products having superior flavor, fragrance, aroma, taste, color and texture.

Although the dissolved gases, carbon dioxide and argon, are generally used as being dissolved in the same aqueous liquid, it is also acceptable to apply each dissolved gas to the fresh vegetables in its own aqueous liquid. If separate liquids are used, however, it is generally preferred if the fresh vegetables are contacted with argon either before or during contact with carbon dioxide.

Generally, one or more of any type of fresh vegetable, fruit or nut, for example, may be treated with the present invention. The following non-limitative examples may be noted: potatoes, corn, tomatoes, onions, herbs, squash, beans, peppers, okra, turnips, broccoli, cauliflower, cabbage, carrots, brussels, sprouts, zucchini, radishes, celery, lettuce and even prepared mixed vegetable salads, apples, oranges, lemons, limes, cherries, pears and any edible nut. Moreover, any fresh vegetable, fruit or nut may be treated with the present invention, whether grown in the ground or grown hydroponically.

Moreover, in using the present invention, it is generally acceptable if the sample, such as any type of fresh vegetable, for example, is contacted with argon either before or during the contact with carbon dioxide. Although, it is not necessary that the samples be treated simultaneously with carbon dioxide and argon, it is preferred that such simultaneous treatment be used.

Surprisingly, in accordance with the present invention, argon is added to an antimicrobially effective amount of dissolved carbon dioxide in aqueous liquid, significantly preserving the desired qualities of the vegetable product. These qualities include, for example, flavor, fragrance, aroma, texture, color and overall appeal.

Generally, the addition of argon to an aqueous solution of carbon dioxide can surprisingly increase the antimicrobial activity thereof, such that less $CO_2$ can be used to obtain the same effect, thus limiting the extent of carbon dioxide induced damage to the vegetable product. Further, such improvement is independent of the preservative effect of argon, but is an additive improvement. The surprising nature of this discovery is evidenced by the fact that no other means is known whereby chemical degradation of vegetable, fruit or nut products may be prevented, when disinfecting the same.

The present invention is advantageous inasmuch as the replacement of highly destructive chlorine by carbon dioxide-argon mixtures is both feasible and economical. Such replacement improves vegetable product quality dramatically.

In more detail, surprising improvements of recognized quality factors of up to 100% are achieved with the present invention, and prevention of individual chemical degradative reaction sequences of up to 35% are observed.

The present invention may be used in conjunction with common processing parameter ranges. Generally, excellent results are achieved in using a temperature range of about −10° C. to 40° C., preferably about 0° C. to about 10° C. It is more preferred still to use a temperature of about 2° C. to about 6° C., usually about 4° C.

Further, pressures of about 0.1 to about 5 atmospheres are generally used, more preferably about 0.5 to about 3 atmospheres. Usually, a pressure of about 1 atmosphere is used.

The present invention generally entails the admixture of argon and carbon dioxide in at least one aqueous solution to achieve acceptable levels of fresh vegetable, fruit or nut disinfection. The amount of argon used is that required to maximally preserve product quality, while the amount of carbon dioxide used is that which is minimally sufficient to achieve desired microorganism loads. Generally, argon is dissolved in the aqueous liquid such that the same is at least 50% by volume saturated therewith, and the aqueous liquid is at least about 20% by volume saturated with carbon dioxide.

However, it is preferred if complete saturation of the aqueous washing solution by volume with both argon and carbon dioxide is effected. It is also preferred, however, if complete saturation of the aqueous washing solution is effected with argon, with carbon dioxide being saturated therein to an extent of only about 25% by volume.

Further, it is preferred if the solute-containing aqueous liquid is prepared by adding thereto a continuous feed of about 75–80:25–20% by volume $Ar:CO_2$ mixture. This mixture provides an excellent preservative effect, with an adequate degree of antimicrobial activity.

However, it is also acceptable to supply a continuous feed of about 50:50% by volume $Ar:CO_2$ mixture into solution. This mixture provides an acceptable preservative effect and an excellent antimicrobial activity.

However, the mixture used may be adjusted to have any amounts of argon/carbon dioxide between the relative amounts of about 75–80:25–20% by volume and about 50:50% by volume/$Ar:Co_2$, depending upon whether the preservative effect or the antimicrobial effect is to be emphasized.

Further, the solute-containing liquid of the present invention may be used in conjunction with a closed system wherein an atmosphere of argon and carbon dioxide is maintained above the liquid.

There are a variety of standard methods available for the detection, qualitative and quantitative measurement of gases, and several are especially well suited for the determination of degree of saturation of gases, particularly noble gases, into solid samples.

Samples generally are completely evacuated as a control for zero % saturation. Such samples may then be completely saturated by contact with noble gases such that no additional noble gas will disappear from a reservoir in contact with the sample. Such saturated samples may then have their gas content driven off by trapped evacuation or by increase in temperature, with the gas sample being identified quantitatively and qualitatively. Analysis is of trapped gases, reservoir gases, or some other headspace of gases, not directly of the sample.

Direct sample analysis methods are available, and include comprehensive GC/MS analysis, or by mass or thermal conductance or GC analysis and comparison with calibrated standards.

The simplest method is GC/MS (gas chromatography/mass spectrometry), which directly determines gas compositions. By preparing a standard absorption curve into a given sample for a series of gases and mixtures, one can accurately determine the degree of saturation at any point in time.

GC/MS is applied to the gas itself, as in the headspace above a sample. The technique may be used either to determine the composition and quantity of gas or mixture being released from a sample, or conversely the composition and quantity of a gas or mixture being absorbed by a sample by following the disappearance of the gas.

Appropriate GC/MS methods include, for example, the use of a 5 Angstrom porous layer open tubular molecular sieve capillary glass column of 0.32 mm diameter and 25 meter length to achieve separation, isothermally e.g. at 75° C. or with any of several temperature ramping programs optimized for a given gas or mixture e.g. from 35°–250° C., wherein ultra-high purity helium or hydrogen carrier gas is used at e.g. 1.0 cc/min flow rate, and gases are detected based upon their ionicity and quantitative presence in the sample, and characterized by their unique mass spectra.

Appropriate experimental conditions might include, for example, completely evacuating a given sample under vacuum to remove all absorbed and dissolved gases, then adding a gas or mixture to the sample and measuring a) the rate of uptake of each component as disappearance from the added gas, and/or b) the final composition of the gas headspace after equilibration. Both measurements are made by GC/MS, and either method can be used in both batch and continuous modes of operation.

A simplification of this analysis entails the use of a GC only, with a thermal conductivity detector, wherein adequate knowledge of the gas saturation process and preparation of calibration curves have been made such that quantification and characterization of gases and mixtures can be accomplished without mass spectral analysis. Such instruments are relatively inexpensive and portable.

A further simplification would depend solely upon measurement of the mass change in the sample upon uptake of various gases or mixtures, which depends upon the use of standard curves or absorption data available from the literature.

An alternate method for such mass measurements is thermogravimetric analysis, which is highly precise, wherein a sample is saturated with gas and mass changes are correlated to thermal change.

In general, both argon and carbon dioxide may be added to the liquid by sparging or by cryogenic introduction which confers advantages in cooling the system as well, or by imposing an atmosphere above a reservoir of solution, or above a standing pipe volume of solution or by introducing the gases by means of pressure or vacuum. Any other conventional means of adding argon and carbon dioxide to the aqueous solution may be used in order to obtain the desired percentages of saturation.

As noted above, the aqueous liquid of the present invention may be completely saturated with both argon or carbon dioxide. However, it is sufficient if the aqueous liquid contains only sufficient carbon dioxide to be antimicrobially effective, and only sufficient argon to inhibit bleaching and oxidizing effects of carbon dioxide.

Further, while it is acceptable to employ an aqueous liquid containing dissolved carbon dioxide and another containing argon, usually a single aqueous liquid is used containing both.

Moreover, regardless of whether one or two aqueous liquids are used, the aqueous liquid containing argon is preferably at least about 25% by volume saturated therewith, more preferably about 50% by volume saturated therewith. It is more preferable still if this amount is at least 75% by volume saturated. The aqueous liquid containing carbon dioxide is usually at least about 25% by volume saturated relative to the level of argon saturation, and, more preferably at least about 50% by volume saturated relative to the level of argon saturation.

As noted above, in accordance with the present invention, any conventional procedure may be used for preparing the aqueous liquid or liquids containing argon and/or carbon dioxide. That is, any conventional procedure may be used to effect partial or complete saturation of the aqueous liquid or liquids with these gases.

This aspect of the present invention will now be further illustrated by reference to certain examples which are provided solely for purposes of illustration and are not intended to be limitative.

EXAMPLE

Lettuce, carrots and red cabbage were washed for 90 sec at 4° C. in water treated as indicated in the Table. Best results:

|   |   |   | Ar:CO$_2$ |   |   |
| --- | --- | --- | --- | --- | --- |
| Products Tested | Ct1 | C10 | 1:1 | 8:2 | Sat.:25% |
| Improvement in Microbial Counts |   |   |   |   |   |
| Lettuce | 10K | 1K | 1K | .7K | 1K |
| Carrots | 10K | 1K | 1K | .8K | .7K |
| Red Cabbage | 100K | 5K | 5K | 3.5K | 1K |
| Improvement in quality |   |   |   |   |   |
| Lettuce | 100 | 25 | 150 | 200 | 175 |
| Carrots | 100 | 25 | 140 | 200 | 180 |
| Red Cabbage | 100 | 25 | 135 | 200 | 150 |

Quality was measured using several parameters as described below.

First, color was evaluated using a Hunter LaB scale using a Hunter Miniscan Colorimeter.

Second, taste, flavor, fragrance and aroma were evaluated using a test panel.

Third, color, texture, and overall appearance were evaluated using a test panel.

Finally, oxidation events were evaluated by gc/ms.

The present mixtures of Ar:CO$_2$ are advantageous for all of the reasons mentioned above, and also because they are cleaner, safer and environmentally superior to chlorinated solutions.

In accordance with a second aspect of the present invention; a method is provided for controlling carbon dioxide concentration in an aqueous solution containing the same.

Generally, in accordance with this aspect of the present invention, argon is dissolved in the aqueous solution to maintain a desired concentration level of carbon dioxide. The amount of argon used is generally dependent upon the desired level of dissolved carbon dioxide in solution. This aspect of the present invention is predicated upon the discovery that argon can, with surprising effectiveness, maintain carbon dioxide levels while saturating an aqueous solution with carbon dioxide. This may be done by stripping and/or desaturating the carbon dioxide in solution and/or by interfering with the transfer of carbon dioxide gas into solution. Quite surprisingly, argon is more effective than nitrogen. Moreover, the desaturation rate of carbon dioxide using argon is higher than when using nitrogen.

This discovery is not only surprising, but affords a number of advantages as many processes depend upon maintaining carbon dioxide concentration in solution. Unfortunately, the existing processes used to control carbon dioxide level are unable to do so with efficiency. Thus, the present invention also provides a means for effecting a superior process control where given concentration of carbon dioxide must be maintained.

A variety of advantages accrue from the use of this aspect of the present invention. Some of these advantages are as follows:

1) An aqueous solution saturated with CO$_2$ can be degassed faster and/or more efficiently using argon than by using nitrogen. Degassing is very much slower without using added gas.

2) The rate that CO$_2$ enters into solution can be slowed using argon which improves process control compared to using nitrogen.

3) CO$_2$ levels can be maintained at any desired level using argon as a controlling gas.

4) The argon may be used to slow saturation or to speed desaturation or as a method of control. This method is more effective and efficient than using nitrogen.

5) This method can be effective when gases are coinjected through the same sparger.

6) This process will work even if any or all of the gases are used as liquids, but efficiencies of stripping/degassing are impaired.

7) This method may be used for gassing/degassing of solids, capable of containing gases, by absorption, for example, in addition to liquids.

8) Two and three phase systems may be so treated.

9) Since Ar is more effective than N$_2$, mixtures of Ar and N$_2$ may be used with concomitant reduction of efficiency. Optimally 100% by volume Ar by volume is used, 90–100% by volume is very effective, 70–90% by volume is also effective, but any amount of argon in excess of about 25% by volume has some effect, and may be used to advantage. Generally, any carrier gas may be used for Ar, and not only N$_2$. Examples of other carrier gases are, for example, O$_2$, Xe, Kr, Ne, He, H$_2$, N$_2$, SF$_6$, CO, CO$_2$, N$_2$O, mixtures or these, and even air. Generally, however, such mixtures with Ar contain no less than 25% by volume Ar and no more than 75% by volume of carrier gas. Preferably, however, the mixture contains at least 50% by volume of Ar and not more than 50% by volume of carrier gas, and more preferably, at least 75% by volume of Ar and not more than 25% by volume of carrier gas.

10) Any partial pressures or flows may be used depending upon the desired final CO$_2$ concentration.

11) Gaseous systems may be enhanced using this method so long as the desired gas components of the process system are not removed from the system during treatment, such as in the case of a gas system trapped within a membrane.

12) This method is effective at any temperature or pressure.

13) Argon is more effective than nitrogen. Oxygen is less effective than argon and more effective than nitrogen. Air is in-between O$_2$ and N$_2$ in effectiveness. Mixtures of argon with oxygen are less effective than argon alone as described above for nitrogen.

14) Any mode of introduction or argon or argon containing mixes may be used including but not limited to sparging, pressure swing, liquid introduction, membranes, diffusive blanketing, or transfer of gas already entrained in carrier liquid.

15) Any flow rate may be used.

16) The utility of the invention is limited by the maximum theoretical solubility of $CO_2$ into the solution being treated. Even in the cases where $CO_2$ is supersaturated, or where the $CO_2$ is, itself, the medium argon, mediated saturation cannot add more $CO_2$ to the system than is possible with $CO_2$ introduction alone, and desaturating cannot proceed below zero ppm of $CO_2$.

This aspect of the present invention will now be further illustrated by reference to certain examples which are provided solely for purposes of illustration and which are not intended to be limitative.

EXAMPLE EXPERIMENT PROTOCOL

EQUIPMENT

LAN-Iaz on-line carbonation monitor with the GP sample system and valve control panel
  MKS Mass Flow controller type 1259C
  MKS Power Supply/Readout type 246B
  DWYER rotameter 0–20 SCFH
  32 gallon batch reactor
  2 sparging element sparging apparatus
  Thermocouple GASES
  Argon
  Carbon Dioxide
  Nitrogen

PROCEDURE

A reactor was filled with approximately 62 liters of tap water at a temperature range of 53°–59° F. The reactor was placed above a $CO_2$ monitor to use a gravity feed system. A thermocouple was used to determine the temperature of the water at the beginning and end of each run. The valves on the carbon dioxide monitor were set in order to draw water from the reactor and recycle it back to the reactor to maintain a constant volume. The intake for the $CO_2$ analyzer was positioned at the bottom of the reactor. The recycle line coming off of valve 3 was also placed towards the bottom. The zero $CO_2$ monitor was then "zeroed". In order to zero the instrument properly, the liquid in the reactor should be used. The valves were set in accordance with the description below. Then the $CO_2$ monitor was turned on and after approximately 1 hour the zero knob was used to adjust the reading to 0 ppm.

Figure 5:
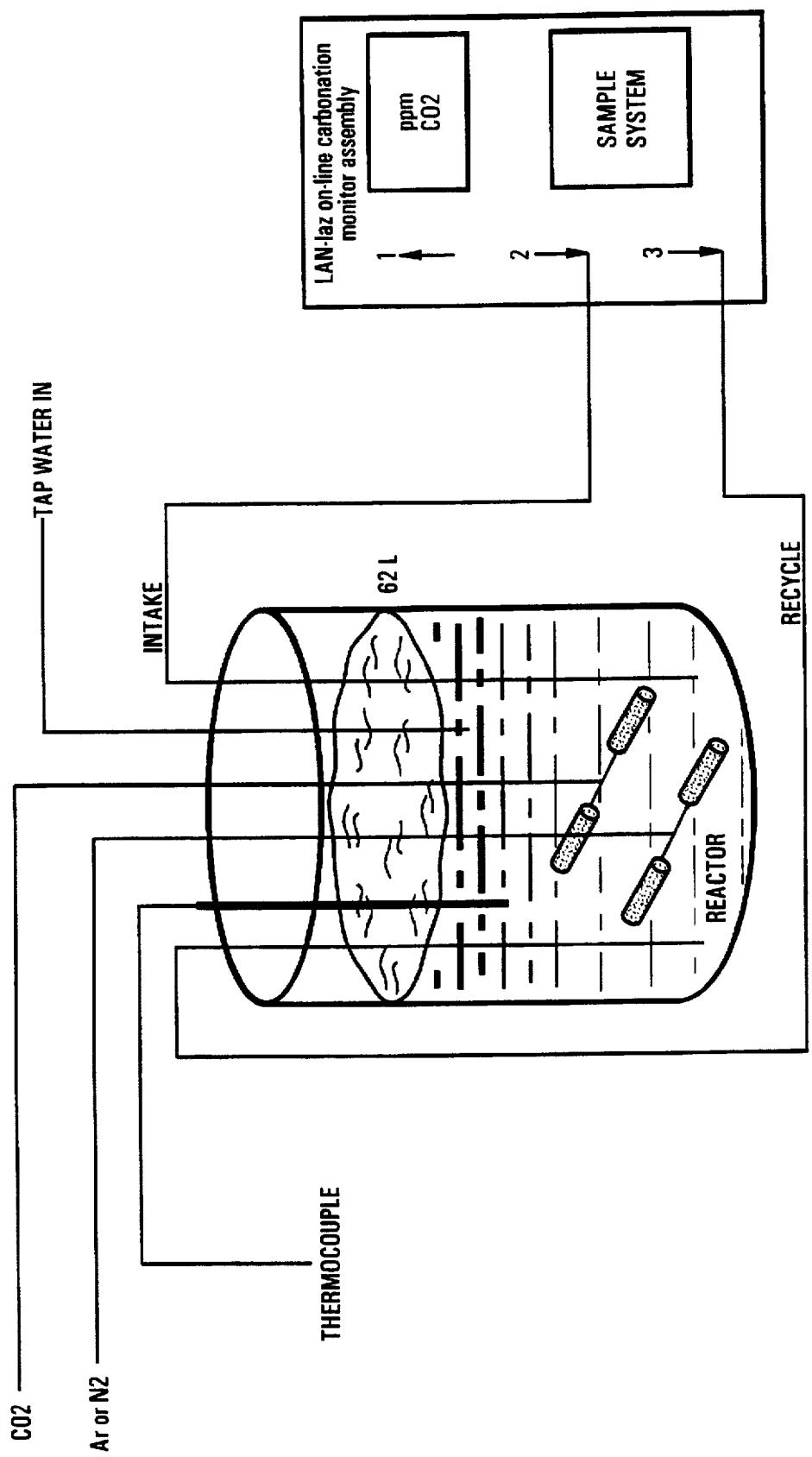
FIG. 5 illustrates an example of an Experimental Setup.

This $CO_2$ monitor uses infrared absorption to measure the amount of $CO_2$ dissolved in any particular solution. The monitor measured the $CO_2$ concentration in ppm by weight. The Beer-Lambert law was used to determine concentration from the absorbance measurement. A polished crystal cylinder with cone-shaped ends was used in this monitor. The cylinder was sandwiched between two sample streams. An infrared beam was passed through the cylinder, while bouncing off of the sample streams, and was measured at the opposite end. The valves associated with the monitor were set up as follows. Valve 1 was not used in these experiments. Valve 2 was turned towards the intake line. Valve 2 was turned towards the recycle line. Reference is made to FIG. 5, which illustrates the Experimental Set-up.

For a saturation run the following procedure was used, once the above initial steps were completed. The carbon dioxide flow rate was established using the rotameter. The rotameter was calibrated for carbon dioxide using the MKS flow controller setup for $CO_2$. The rotameter was marked at 5, 10, 15, SCFH for $CO_2$. Then the Argon or Nitrogen flow was set using the MKS flow controller. A sparging apparatus, consisting of 2 Alltech Hastalloy® Mobile Phase Filters connected with Swagelok® fittings, was used for each gas. Flows were set in a separate reactor using the same volume of water. Then, both sets of sparging filters were simultaneously placed in the bottom of the first reactor. The stopwatch was started at this time and readings, in ppm, were taken from the $CO_2$ monitor.

A desaturation run followed the above procedure with the following exceptions. The $CO_2$ sparging apparatus was placed in the reactor by itself and allowed to reach 1200 ppm on the monitor before the Argon or Nitrogen apparatus was added. Then, the $CO_2$ was shut off and the Argon or Nitrogen apparatus, with the gas on, was placed at the bottom of the reactor. The stopwatch was started at this time and readings were taken, as described above.

PPM readings can be taken at any desired time interval, however it is particularly recommended that many readings by taken at the beginning of a run.

EXAMPLE 1

Saturation of $CO_2$ with and without argon versus nitrogen,

The procedure for saturation was used. The $CO_2$ flow was set to 2.31 L/min and the nitrogen and argon flows were set to 4.62 L/min, respectively. For the first run, $CO_2$ and nitrogen were used. For the second run, $CO_2$ and argon were used. Readings were taken for 25 minutes, and then the next run was started.

The results are depicted in Tables 1–3 and FIG. 1.

EXAMPLE 2

Desaturation of $CO_2$ with and without argon versus nitrogen

The procedure for desaturation was used. The water was saturated with $CO_2$, and then desaturated using nitrogen and then argon, both at 2.31 L/min. The $CO_2$ level was allowed to reach 1200 ppm before effecting desaturation with the appropriate gas. Readings were taken until the ppm level of $CO_2$ reached approximately 25% of the beginning level. Desaturation without added gas was unrecordably slow.

Figure 2:
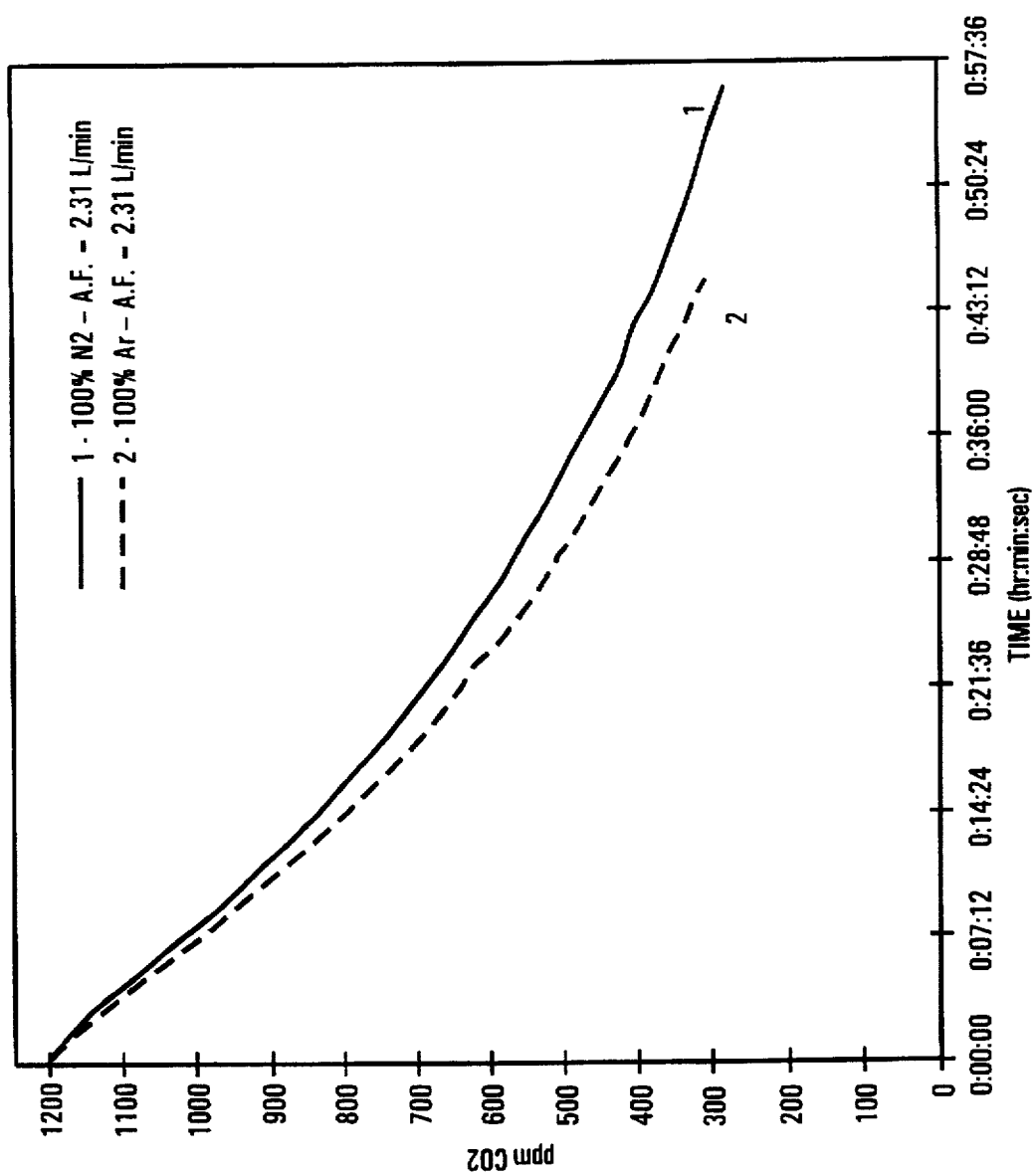
FIG. 2 illustrates $CO_2$ desaturation curves.

The results are depicted in Tables 4 and 5 and FIG. 2.

EXAMPLE 3

Achieving different concentrations and/or final concentrations of $CO_2$ using argon, The same procedure was used as in Experiment 1, but argon was used only at flow rates of 2.31 L/min, 4.62 L/min, and 6.93 L/min. The $CO_2$ flow rate was be set at 2.31 L/min for each run.

Figure 3:
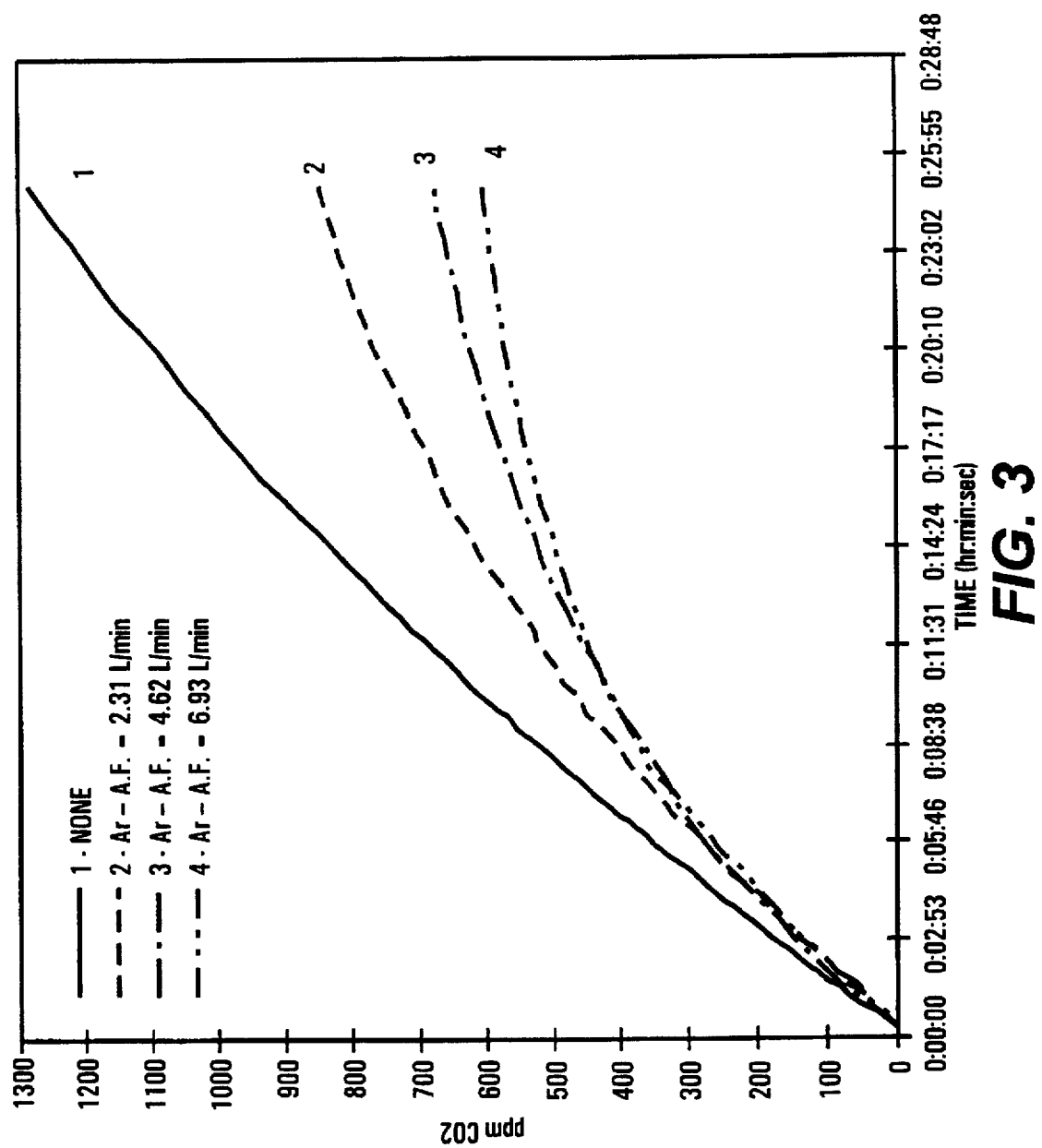
FIG. 3 illustrates $CO_2$ saturation curves obtained with a sparging experiment.

The results are depicted in Tables 6–9 and FIG. 3.

EXAMPLE EXPERIMENT 4

Example of industrial control.

In an industrial water bath, separate injectors were used to control the saturation and desaturation of $CO_2$ using Ar. The water bath with a capacity of 2800 liters was used, as well as a pump recirculating the water at a rate of 1100 L/min. Argon was injected into the discharge line of the pump at a rate of 34.6 L/min, for runs 1–4 and carbon dioxide was injected into the pump intake line at 14.7 L/min for run 1 and 7.0 L/mi for run 2. Rotameters were used to control the argon and carbon dioxide flows. The temperature of the water bath was 75° F. Each injector consisted of a Parker in-line filter 5 micrometer pore size ¼" NPT with a Parker ball valve ¼" female NPT upstream. Runs 3 and 4 were desaturation runs starting with $CO_2$ concentrations of 100 and 170 ppm by weight, respectively. A $CO_2$ monitor was used to read the amount of $CO_2$ in solution throughout each run. The argon saturation reached a level of 95%. In a further process run with flows of 34.6 L/min Ar and 14.7 L/min $CO_2$, an equilibrium $CO_2$ concentration of 235 ppm was reached and maintained for 4 hours. This concentration could have been maintained indefinitely. This was achieved by doubling the $CO_2$ flow for the first 15 minutes then changing the flow to 34.6 L/min AR and 14.7 L/min $CO_2$. An equilibrium level of 235 ppm was reached within 30 minutes overall. Clearly, the above results demonstrated that argon may be used effectively in the described manner to fix a final $CO_2$ level at any desired level below saturation.

Figure 4:
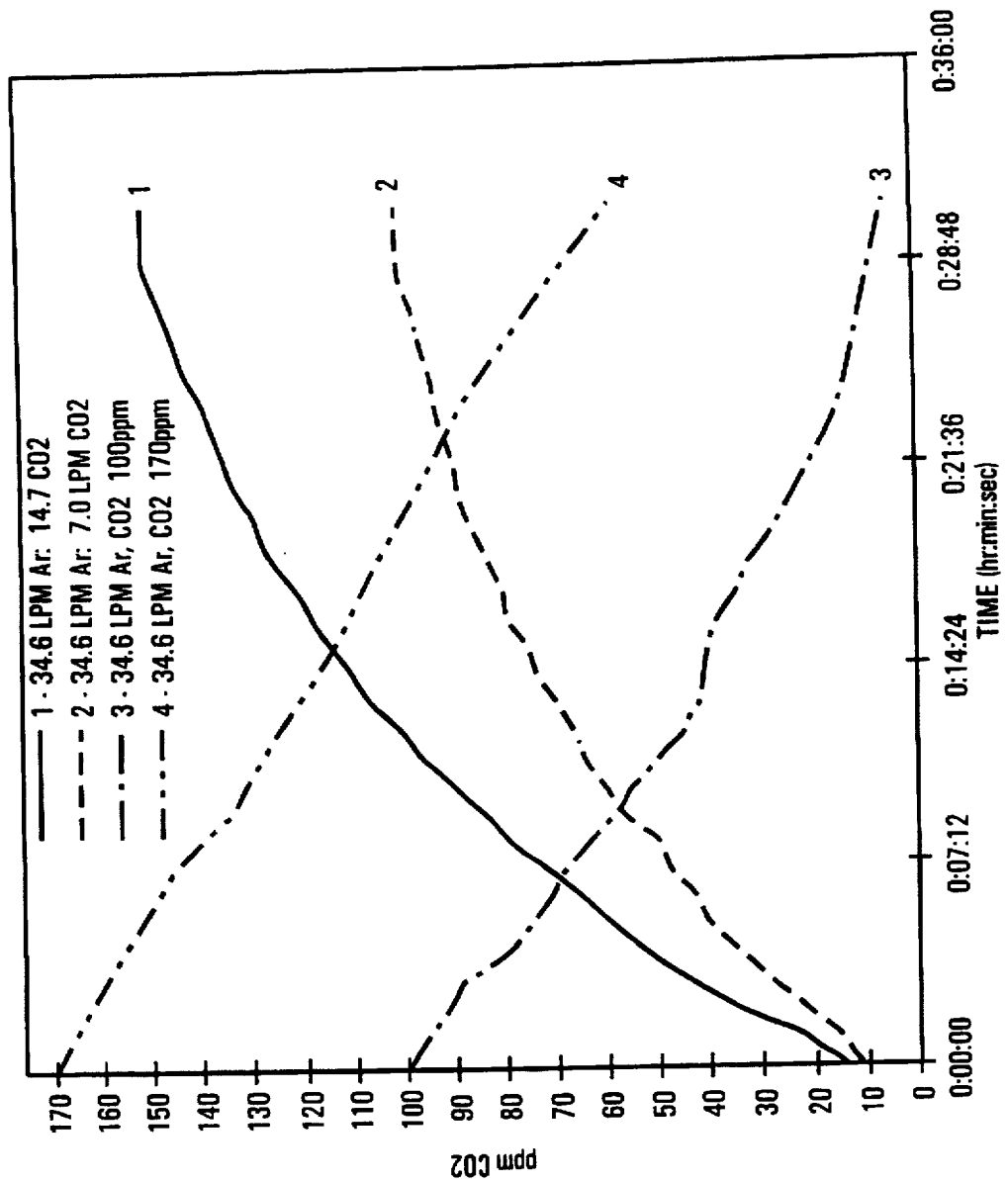
FIG. 4 illustrates the results of an industrial application under real mixing conditions.

The results are depicted in Tables 10–13 and FIG. 4.

TABLE 1

100% CO2
2 stones - RECYCLE
Actual flow (CO2) = 2.31 L/min
8 GPH H2O
Start Temp. = 54.1° F.
End Temp. = 55.9° F.
62 liters H2O (start)
100% CO2 - 2.31 L/min

| Time (sec) | [CO2] (ppm) |
| --- | --- |
| 0:00:00 | 0 |
| 0:00:15 | 1 |
| 0:00:30 | 2 |
| 0:00:45 | 31 |
| 0:01:00 | 52 |
| 0:01:15 | 70 |
| 0:01:30 | 82 |
| 0:01:45 | 100 |
| 0:02:00 | 117 |
| 0:02:30 | 150 |
| 0:03:00 | 182 |
| 0:03:30 | 213 |
| 0:04:00 | 247 |
| 0:04:30 | 274 |
| 0:05:00 | 305 |
| 0:05:30 | 339 |
| 0:06:00 | 364 |
| 0:06:35 | 400 |
| 0:07:00 | 427 |
| 0:07:30 | 456 |
| 0:08:00 | 483 |
| 0:08:30 | 512 |
| 0:09:00 | 543 |
| 0:09:30 | 566 |
| 0:10:00 | 598 |
| 0:10:30 | 625 |
| 0:11:00 | 651 |
| 0:11:30 | 678 |
| 0:12:00 | 709 |
| 0:13:00 | 755 |
| 0:14:00 | 804 |
| 0:15:00 | 852 |
| 0:16:00 | 903 |
| 0:17:00 | 950 |
| 0:18:00 | 992 |
| 0:19:00 | 1037 |
| 0:20:00 | 1076 |
| 0:21:00 | 1120 |
| 0:22:00 | 1162 |
| 0:23:00 | 1196 |
| 0:24:00 | 1235 |
| 0:25:00 | 1271 |

TABLE 2

33% CO2:67% N2
4 stones - RECYCLE
Actual flow (N2) = 4.62 L/min
Actual flow (CO2) = 2.31 L/min
8 GPH H2O
Start Temp. = 53.4° F.
End Temp. = 55.0° F.
62 liters H2O (start)
RUN 1

| Time (sec) | [CO2] (ppm) |
| --- | --- |
| 0:00:00 | 0 |
| 0:00:15 | 2 |
| 0:00:30 | 9 |
| 0:00:45 | 22 |
| 0:01:00 | 36 |
| 0:01:15 | 54 |
| 0:01:30 | 74 |
| 0:01:45 | 85 |
| 0:02:00 | 99 |
| 0:02:30 | 133 |
| 0:03:00 | 160 |
| 0:03:30 | 190 |
| 0:04:00 | 216 |
| 0:04:30 | 242 |
| 0:05:00 | 272 |
| 0:05:30 | 293 |
| 0:06:00 | 320 |
| 0:06:30 | 338 |
| 0:07:00 | 365 |
| 0:07:30 | 386 |
| 0:08:00 | 405 |
| 0:08:30 | 420 |
| 0:09:00 | 439 |
| 0:09:30 | 480 |
| 0:10:00 | 478 |
| 0:10:30 | 495 |
| 0:11:00 | 510 |
| 0:11:30 | 529 |
| 0:12:00 | 543 |
| 0:13:00 | 573 |
| 0:14:00 | 596 |
| 0:15:00 | 624 |
| 0:16:00 | 649 |
| 0:17:00 | 668 |
| 0:18:00 | 690 |
| 0:19:00 | 710 |
| 0:20:00 | 720 |
| 0:21:00 | 742 |
| 0:22:00 | 754 |
| 0:23:00 | 768 |
| 0:24:00 | 782 |
| 0:25:00 | 795 |

TABLE 3

33% CO2:67% Ar
4 stones - RECYCLE
Actual flow (Ar) = 4.62 L/min
Actual flow (CO2) = 2.31 L/min
8 GPH H2O
Start Temp. = 55.2° F.
End Temp. = 56.4° F.
62 liters H2O (start)
RUN 2

| Time (sec) | [CO2] (ppm) |
| --- | --- |
| 0:00:00 | 0 |
| 0:00:15 | 0 |
| 0:00:30 | 9 |
| 0:00:45 | 22 |
| 0:01:00 | 35 |
| 0:01:15 | 47 |
| 0:01:30 | 65 |

TABLE 3-continued

| | |
|---|---|
| 0:01:45 | 78 |
| 0:02:00 | 88 |
| 0:02:30 | 116 |
| 0:03:00 | 142 |
| 0:03:30 | 163 |
| 0:04:00 | 185 |
| 0:04:30 | 207 |
| 0:05:00 | 228 |
| 0:05:30 | 252 |
| 0:06:00 | 270 |
| 0:06:30 | 290 |
| 0:07:00 | 309 |
| 0:07:30 | 327 |
| 0:08:00 | 343 |
| 0:09:19 | 385 |
| 0:09:30 | 394 |
| 0:10:00 | 409 |
| 0:10:30 | 420 |
| 0:11:00 | 435 |
| 0:11:30 | 449 |
| 0:12:00 | 464 |
| 0:13:00 | 487 |
| 0:14:00 | 513 |
| 0:15:00 | 530 |
| 0:16:00 | 550 |
| 0:17:00 | 567 |
| 0:18:00 | 584 |
| 0:19:00 | 598 |
| 0:20:00 | 613 |
| 0:21:00 | 628 |
| 0:22:00 | 638 |
| 0:23:00 | 649 |
| 0:24:00 | 662 |
| 0:25:00 | 668 |

TABLE 4

100% N2 INTO 100% SAT. CO2 SOL.
2 stones - RECYCLE
MKS LED = 2.31 L/min
Conversion factor set at 1
Actual flow = 2.31 L/min
8 GPH H2O
Start Temp. = 54.5° F.
End Temp. = 57.9° F.
62 liters H2O
RUN 1

| Time (sec) | [CO2] (ppm) |
|---|---|
| 0:00:00 | 1200 |
| 0:00:30 | 1196 |
| 0:01:00 | 1185 |
| 0:01:30 | 1174 |
| 0:02:00 | 1157 |
| 0:03:00 | 1136 |
| 0:04:00 | 1106 |
| 0:06:00 | 1050 |
| 0:08:00 | 988 |
| 0:10:00 | 938 |
| 0:12:00 | 890 |
| 0:14:00 | 839 |
| 0:16:00 | 799 |
| 0:18:00 | 755 |
| 0:20:00 | 715 |
| 0:22:00 | 677 |
| 0:24:20 | 637 |
| 0:26:00 | 610 |
| 0:28:00 | 575 |
| 0:30:00 | 550 |
| 0:32:00 | 520 |
| 0:34:00 | 494 |
| 0:36:00 | 468 |
| 0:38:00 | 440 |
| 0:40:00 | 413 |
| 0:42:00 | 398 |

TABLE 4-continued

| | |
|---|---|
| 0:44:00 | 374 |
| 0:46:00 | 354 |
| 0:48:00 | 338 |
| 0:50:00 | 320 |
| 0:52:00 | 306 |
| 0:54:00 | 290 |
| 0:56:00 | 272 |
| 0:58:00 | 260 |
| 13:00:00 | 245 |
| 13:02:00 | 233 |
| 13:04:00 | 223 |
| 13:06:00 | 210 |

TABLE 5

100% Ar INTO 100% SAT. CO2 SOL.
2 stones - RECYCLE
MKS LED = 2.31 L/min
Conversion factor set at 1.37
Actual flow = 2.31 L/min
8 GPH H2O
Start Temp. = 53.9° F.
End Temp. = 57.0° F.
62 liters H2O RUN 2

| Time (sec) | [CO2] (ppm) |
|---|---|
| 0:00:00 | 1200 |
| 0:00:30 | 1196 |
| 0:01:00 | 1181 |
| 0:01:30 | 1165 |
| 0:02:00 | 1150 |
| 0:04:00 | 1091 |
| 0:06:00 | 1027 |
| 0:08:00 | 966 |
| 0:10:20 | 903 |
| 0:12:00 | 855 |
| 0:14:30 | 792 |
| 0:16:00 | 755 |
| 0:18:00 | 709 |
| 0:20:00 | 664 |
| 0:22:49 | 615 |
| 0:24:00 | 585 |
| 0:26:00 | 549 |
| 0:28:45 | 505 |
| 0:29:00 | 505 |
| 0:30:00 | 486 |
| 0:32:00 | 457 |
| 0:34:00 | 429 |
| 0:36:00 | 402 |
| 0:38:00 | 377 |
| 0:40:00 | 356 |
| 0:42:00 | 332 |
| 0:44:00 | 312 |
| 0:45:00 | 300 |

TABLE 6

100% CO2
2 stones - with RECYCLE
Actual flow (CO2) = 2.31 L/min
8 GPH H2O
Start Temp. = 54.1° F.
End Temp. = 55.9° F.
62 liters H2O (start)
100% CO2 - 2.31 L/min

| Time (sec) | [CO2] (ppm) |
|---|---|
| 0:00:00 | 0 |
| 0:00:15 | 1 |
| 0:00:30 | 2 |
| 0:00:45 | 31 |
| 0:01:00 | 52 |

TABLE 6-continued

| | |
|---|---|
| 0:01:15 | 70 |
| 0:01:30 | 82 |
| 0:01:45 | 100 |
| 0:02:00 | 117 |
| 0:02:30 | 150 |
| 0:03:00 | 182 |
| 0:03:30 | 213 |
| 0:04:00 | 247 |
| 0:04:30 | 274 |
| 0:05:00 | 305 |
| 0:05:30 | 339 |
| 0:06:00 | 364 |
| 0:06:35 | 400 |
| 0:07:00 | 427 |
| 0:07:30 | 456 |
| 0:08:00 | 483 |
| 0:08:30 | 512 |
| 0:09:00 | 543 |
| 0:09:30 | 566 |
| 0:10:00 | 598 |
| 0:10:30 | 625 |
| 0:11:00 | 651 |
| 0:11:30 | 678 |
| 0:12:00 | 709 |
| 0:13:00 | 755 |
| 0:14:00 | 804 |
| 0:15:00 | 852 |
| 0:16:00 | 903 |
| 0:17:00 | 950 |
| 0:18:00 | 992 |
| 0:19:00 | 1037 |
| 0:20:00 | 1076 |
| 0:21:00 | 1120 |
| 0:22:00 | 1162 |
| 0:23:00 | 1196 |
| 0:24:00 | 1235 |
| 0:25:00 | 1271 |

TABLE 7

50% CO2:50% Ar
4 stones - with RECYCLE
Actual flow (Ar) = 2.31 L/min
Actual flow (CO2) = 2.31 L/min
8 GPH H2O
Start Temp. = 55.9° F.
End Temp. = 56.8° F.
62 liters H2O (start)
RUN 1

| Time (sec) | [CO2] (ppm) |
|---|---|
| 0:00:00 | 0 |
| 0:00:15 | 0 |
| 0:00:30 | 0 |
| 0:00:45 | 20 |
| 0:01:00 | 35 |
| 0:01:17 | 49 |
| 0:01:30 | 53 |
| 0:01:45 | 65 |
| 0:02:00 | 89 |
| 0:02:30 | 109 |
| 0:03:00 | 143 |
| 0:03:30 | 166 |
| 0:04:00 | 190 |
| 0:04:30 | 215 |
| 0:05:00 | 245 |
| 0:05:30 | 268 |
| 0:06:00 | 287 |
| 0:06:30 | 317 |
| 0:07:00 | 338 |
| 0:07:30 | 360 |
| 0:08:00 | 382 |
| 0:08:30 | 398 |
| 0:09:00 | 417 |
| 0:09:30 | 446 |

TABLE 7-continued

| | |
|---|---|
| 0:10:00 | 458 |
| 0:10:30 | 483 |
| 0:11:00 | 497 |
| 0:11:30 | 517 |
| 0:12:00 | 528 |
| 0:13:00 | 563 |
| 0:14:00 | 600 |
| 0:15:00 | 628 |
| 0:16:00 | 658 |
| 0:17:00 | 677 |
| 0:18:00 | 704 |
| 0:19:00 | 726 |
| 0:20:00 | 754 |
| 0:21:00 | 772 |
| 0:22:00 | 790 |
| 0:23:00 | 809 |
| 0:24:00 | 822 |
| 0:25:00 | 839 |

TABLE 8

33% CO2:67% Ar
4 stones - with RECYCLE
Actual flow (Ar) = 4.62 L/min
Actual flow (CO2) = 2.31 L/min
8 GPH H2O
Start Temp. = 55.2° F.
End Temp. = 56.4° F.
62 liters H2O (start)
RUN 2

| Time (sec) | [CO2] (ppm) |
|---|---|
| 0:00:00 | 0 |
| 0:00:15 | 0 |
| 0:00:30 | 9 |
| 0:00:45 | 22 |
| 0:01:00 | 35 |
| 0:01:05 | 47 |
| 0:01:30 | 65 |
| 0:01:45 | 78 |
| 0:02:00 | 88 |
| 0:02:30 | 116 |
| 0:03:00 | 142 |
| 0:03:30 | 153 |
| 0:04:00 | 185 |
| 0:04:30 | 207 |
| 0:05:00 | 228 |
| 0:05:30 | 252 |
| 0:06:00 | 270 |
| 0:06:30 | 290 |
| 0:07:00 | 308 |
| 0:07:30 | 327 |
| 0:08:00 | 343 |
| C:09:19 | 385 |
| 0:09:30 | 394 |
| 0:10:00 | 409 |
| 0:10:30 | 420 |
| 0:11:00 | 435 |
| 0:11:30 | 449 |
| 0:12:00 | 464 |
| 0:13:00 | 487 |
| 0:14:00 | 513 |
| 0:15:00 | 530 |
| 0:16:00 | 550 |
| 0:17:00 | 567 |
| 0:18:00 | 584 |
| 0:19:00 | 598 |
| 0:20:00 | 613 |
| 0:21:00 | 628 |
| 0:22:00 | 638 |
| 0:23:00 | 649 |
| 0:24:00 | 662 |
| 0:25:00 | 668 |

TABLE 9

25% CO2:75% Ar
4 stones - with RECYCLE
Actual flow (Ar) = 6.93 L/min
Actual flow (CO2) = 2.31 L/min
8 GPH H2O
Start Temp. = 53.6° F.
End Temp. = 55.0° F.
62 liters H2O (start)
RUN 3

| Time (sec) | [CO2] (ppm) |
|---|---|
| 0:00:00 | 0 |
| 0:00:15 | 0 |
| 0:00:30 | 13 |
| 0:00:45 | 29 |
| 0:01:00 | 42 |
| 0:01:15 | 60 |
| 0:01:30 | 74 |
| 0:01:45 | 88 |
| 0:02:00 | 101 |
| 0:02:30 | 126 |
| 0:03:00 | 152 |
| 0:03:30 | 172 |
| 0:04:00 | 200 |
| 0:04:30 | 222 |
| 0:05:00 | 243 |
| 0:05:30 | 265 |
| 0:06:00 | 284 |
| 0:06:30 | 301 |
| 0:07:00 | 318 |
| 0:07:30 | 335 |
| 0:08:00 | 355 |
| 0:08:30 | 367 |
| 0:09:00 | 381 |
| 0:09:30 | 395 |
| 0:10:00 | 407 |
| 0:10:30 | 420 |
| 0:11:00 | 431 |
| 0:11:30 | 442 |
| 0:12:00 | 453 |
| 0:13:00 | 471 |
| 0:14:00 | 488 |
| 0:15:00 | 501 |
| 0:16:00 | 518 |
| 0:17:00 | 531 |
| 0:18:00 | 542 |
| 0:20:00 | 563 |
| 0:21:00 | 570 |
| 0:22:00 | 577 |
| 0:23:00 | 584 |
| 0:24:00 | 589 |
| 0:25:00 | 595 |

TABLE 10

29.85% CO2:70.15% Ar
2 Injectors
Actual flow (Ar) = 34.6 L/min
Actual flow (CO2) = 14.7 L/min
1136 LPM H2O
Temp. = 75° F.
2800 Liters H2O
Saturation
RUN 1

| Time (sec) | [CO2] (ppm) |
|---|---|
| 0:00:00 | 14 |
| 0:01:00 | 22 |
| 0:02:00 | 34 |
| 0:03:00 | 44 |
| 0:04:00 | 52 |
| 0:05:00 | 59 |
| 0:06:00 | 65 |
| 0:07:00 | 72 |

TABLE 10-continued

| Time (sec) | [CO2] (ppm) |
|---|---|
| 0:08:00 | 79 |
| 0:09:00 | 84 |
| 0:10:00 | 90 |
| 0:11:00 | 96 |
| 0:12:00 | 100 |
| 0:13:00 | 106 |
| 0:14:00 | 110 |
| 0:15:00 | 114 |
| 0:16:00 | 118 |
| 0:17:00 | 121 |
| 0:18:00 | 125 |
| 0:19:00 | 128 |
| 0:20:00 | 130 |
| 0:21:00 | 133 |
| 0:22:00 | 135 |
| 0:23:00 | 137 |
| 0:24:00 | 139 |
| 0:25:00 | 142 |
| 0:26:00 | 144 |
| 0:27:00 | 146 |
| 0:28:00 | 148 |
| 0:29:00 | 150 |
| 0:30:00 | 150 |
| 0:31:00 | 150 |

TABLE 11

16.83% CO2:83.17% Ar
2 Injectors
Actual flow (Ar) = 34.6 L/min
Actual flow (CO2) = 7 L/min
1136 LPM H2O
Temp. = 75° F.
2800 Liters H2O
Saturation
RUN 2

| Time (sec) | [CO2] (ppm) |
|---|---|
| 0:00:00 | 11 |
| 0:01:00 | 15 |
| 0:03:00 | 28 |
| 0:04:00 | 34 |
| 0:05:00 | 40 |
| 0:06:00 | 43 |
| 0:07:00 | 48 |
| 0:08:00 | 50 |
| 0:09:00 | 57 |
| 0:10:00 | 60 |
| 0:11:00 | 64 |
| 0:12:00 | 66 |
| 0:13:00 | 69 |
| 0:14:00 | 73 |
| 0:15:00 | 75 |
| 0:16:00 | 79 |
| 0:17:00 | 80 |
| 0:20:00 | 88 |
| 0:21:00 | 89 |
| 0:22:00 | 90 |
| 0:23:00 | 92 |
| 0:24:00 | 93 |
| 0:25:00 | 94 |
| 0:26:00 | 96 |
| 0:27:00 | 97 |
| 0:28:00 | 99 |
| 0:29:00 | 100 |
| 0:30:00 | 100 |
| 0:31:00 | 100 |

TABLE 12

100% Ar
2 Injectors
Actual flow (Ar) = 34.6 L/min

TABLE 12-continued

CO2 at 100 ppm
1136 LPM H2O
Temp. = 75° F.
2800 Liters H2O
Desaturation
RUN 3

| Time (sec) | [CO2] (ppm) |
|---|---|
| 0:00:00 | 100 |
| 0:02:00 | 92 |
| 0:03:00 | 89 |
| 0:04:00 | 80 |
| 0:05:00 | 75 |
| 0:06:00 | 71 |
| 0:07:00 | 68 |
| 0:09:00 | 58 |
| 0:10:00 | 55 |
| 0:11:00 | 50 |
| 0:12:00 | 45 |
| 0:13:00 | 42 |
| 0:14:00 | 41 |
| 0:15:00 | 40 |
| 0:16:00 | 38 |
| 0:17:00 | 34 |
| 0:18:00 | 32 |
| 0:19:00 | 28 |
| 0:20:00 | 25 |
| 0:21:00 | 22 |
| 0:22:00 | 19 |
| 0:23:00 | 16 |
| 0:24:00 | 14 |
| 0:31:00 | 5 |

TABLE 13

100% Ar
2 Injectors
Actual flow (Ar) = 34.6 L/min
CO2 at 170 ppm
1136 LPM H2O
Temp. = 75° F.
2800 Liters H2O
Desaturation
RUN 4

| Time (sec) | [CO2] (ppm) |
|---|---|
| 0:00:00 | 170 |
| 0:07:00 | 145 |
| 0:09:00 | 134 |
| 0:12:00 | 125 |
| 0:15:00 | 114 |
| 0:17:00 | 108 |
| 0:24:00 | 87 |
| 0:31:00 | 58 |

The results depicted in FIGS. 1–4 will now be discussed in more detail.

FIG. 1 clearly illustrates that argon is superior to nitrogen in controlling the rate and level of $CO_2$ saturation. FIG. 2 illustrates that argon displaces the $CO_2$ faster than nitrogen. FIG. 3 illustrates that increasing the flow rate of argon while keeping the $CO_2$ flow rate constant, causes the rate and level of $CO_2$ saturation to decrease. FIG. 3 also demonstrates that as the argon flow rate increases the difference in depression of $CO_2$ levels compresses. FIG. 4 shows that saturation of $CO_2$ and desaturation of $CO_2$ is a process which is fully controllable using argon by the described method, and that any desired given $CO_2$ concentration can be obtained.

Thus, the examples show that argon can be used to control $CO_2$ levels as desired in solution, and that argon is superior to nitrogen for this use.

Generally, the argon and carbon dioxide used in accordance with any aspect of the present invention is "substantially pure", i.e. at least 99.9% by volume pure. Of course, this argon may be diluted with carrier gas as described hereinabove. Any and all of the gases used herein are commercially available.

Having described the present invention, it will be apparent that many changes and modifications may be made without departing from the spirit and the scope of the present invention.

What is claimed is:

1. A method of washing one or more fresh vegetables, which comprises washing the one or more fresh vegetables with at least one aqueous liquid, comprising at least an antimicrobially effective amount of dissolved carbon dioxide, and at least an amount of dissolved argon effective to inhibit bleaching and oxidizing effects of carbon dioxide.

2. The method of claim 1, wherein said aqueous liquid is water.

3. The method of claim 2, wherein said water is fresh water.

4. The method of claim 2, wherein said aqueous liquid is water containing a solute.

5. The method of claim 1, wherein said aqueous liquid is at least 50% saturated with argon.

6. The method of claim 5, wherein said aqueous liquid is at least 20% saturated with carbon dioxide.

7. The method of claim 6, wherein said aqueous liquid is completely saturated with carbon dioxide.

8. The method of claim 5, wherein said aqueous liquid is completely saturated with argon.

9. The method of claim 1, wherein both of said argon and said carbon dioxide are dissolved in the same aqueous liquid and are applied to the fresh vegetables together.

10. The method of claim 1, wherein said argon and said carbon dioxide are each dissolved in separate aqueous liquids, and applied such that the aqueous liquid containing carbon dioxide is applied during or after said aqueous liquid containing argon is applied.

11. The method of claim 1, wherein said aqueous liquid having carbon dioxide and argon dissolved therein is prepared by continuously feeding a gas mixture of about 75–80%:25-20% argon:carbon dioxide thereinto.

12. The method of claim 1, wherein said aqueous liquid having carbon dioxide and argon dissolved therein is prepared by continuously feeding a gas mixture of about 50:50% argon: carbon dioxide thereinto.

13. The method of claim 1, wherein said one or more fresh vegetables are in the form of prepared mixed vegetable salads.

* * * * *